US012692753B2

(12) United States Patent
Greci et al.

(10) Patent No.: US 12,692,753 B2
(45) Date of Patent: Jul. 28, 2026

(54) WELLBORE CABLE CLAMP

(71) Applicant: Halliburton Energy Services, Inc.,
Houston, TX (US)

(72) Inventors: Stephen Michael Greci, Carrollton, TX
(US); Nicholas A. Kuo, Carrollton, TX
(US); Ryan M. Novelen, Carrollton,
TX (US); Ryan W. McChesney,
Carrollton, TX (US)

(73) Assignee: Halliburton Energy Services, Inc.,
Houston, TX (US)

( * ) Notice: Subject to any disclaimer, the term of this
patent is extended or adjusted under 35
U.S.C. 154(b) by 0 days.

(21) Appl. No.: 18/791,897

(22) Filed: Aug. 1, 2024

(65) Prior Publication Data

US 2025/0283381 A1 Sep. 11, 2025

Related U.S. Application Data

(60) Provisional application No. 63/561,407, filed on Mar.
5, 2024.

(51) Int. Cl.
E21B 17/02 (2006.01)
F16L 3/00 (2006.01)

(52) U.S. Cl.
CPC .............. E21B 17/026 (2013.01); F16L 3/00
(2013.01)

(58) Field of Classification Search
CPC ............................ E21B 17/023; E21B 17/026
See application file for complete search history.

(56) References Cited

U.S. PATENT DOCUMENTS

| | | | |
|---|---|---|---|
| 6,681,854 B2 | 1/2004 | Danos | |
| 7,802,622 B2 | 9/2010 | Roaldsnes | |
| 8,136,589 B2 | 3/2012 | Holderman et al. | |
| 8,302,697 B2 | 11/2012 | Kuo | |
| 2002/0053439 A1* | 5/2002 | Danos ................. | E21B 17/1035 |
| | | | 166/227 |
| 2009/0277652 A1 | 11/2009 | Nutley et al. | |
| 2009/0314498 A1 | 12/2009 | Kannan et al. | |
| 2010/0230094 A1 | 9/2010 | Foster et al. | |
| 2021/0123319 A1 | 4/2021 | Greci et al. | |
| 2023/0349239 A1 | 11/2023 | Mcleary et al. | |

OTHER PUBLICATIONS

"PCT Application No. PCT/US24/43311 International Search Report
and Written Opinion", Dec. 3, 2024, 11 pages.

* cited by examiner

*Primary Examiner* — Kristyn A Hall
(74) *Attorney, Agent, or Firm* — DeLizio, Peacock, Lewin
& Guerra LLP

(57) ABSTRACT

A tubing to be positioned in a wellbore, the tubing com-
prising: a channel having multiple pairs of slots created on
each side of the channel, wherein each of the multiple pairs
of slots is positioned at different depths of the wellbore,
wherein at least one cable is to be positioned in the channel
and comprises at least one of a sensor or a splice; and a
clamp configured to be positioned in each of the multiple
pairs of slots and configurable to clamp down on the at least
one cable positioned in the channel, wherein the clamp is to
be positioned in a first pair of slots of the multiple pairs of
the slots such that clamp is not positioned over the at least
one sensor or the splice of the least one cable.

24 Claims, 16 Drawing Sheets

1600

WELLBORE CABLE CLAMP

BACKGROUND

In a wellbore, clamps for holding cables in position may be needed for various applications downhole. For example, a clamp may be needed to hold one or more cables in a channel. One such example is a clamp to hold cables in a channel for a sand control screen. However, often times there may be splices or sensors on these cables that will either be larger than a size of the cables or be sensitive to clamping loads.

BRIEF DESCRIPTION OF THE DRAWINGS

Embodiments of the disclosure may be better understood by referencing the accompanying drawings.

DESCRIPTION

Figure 1:
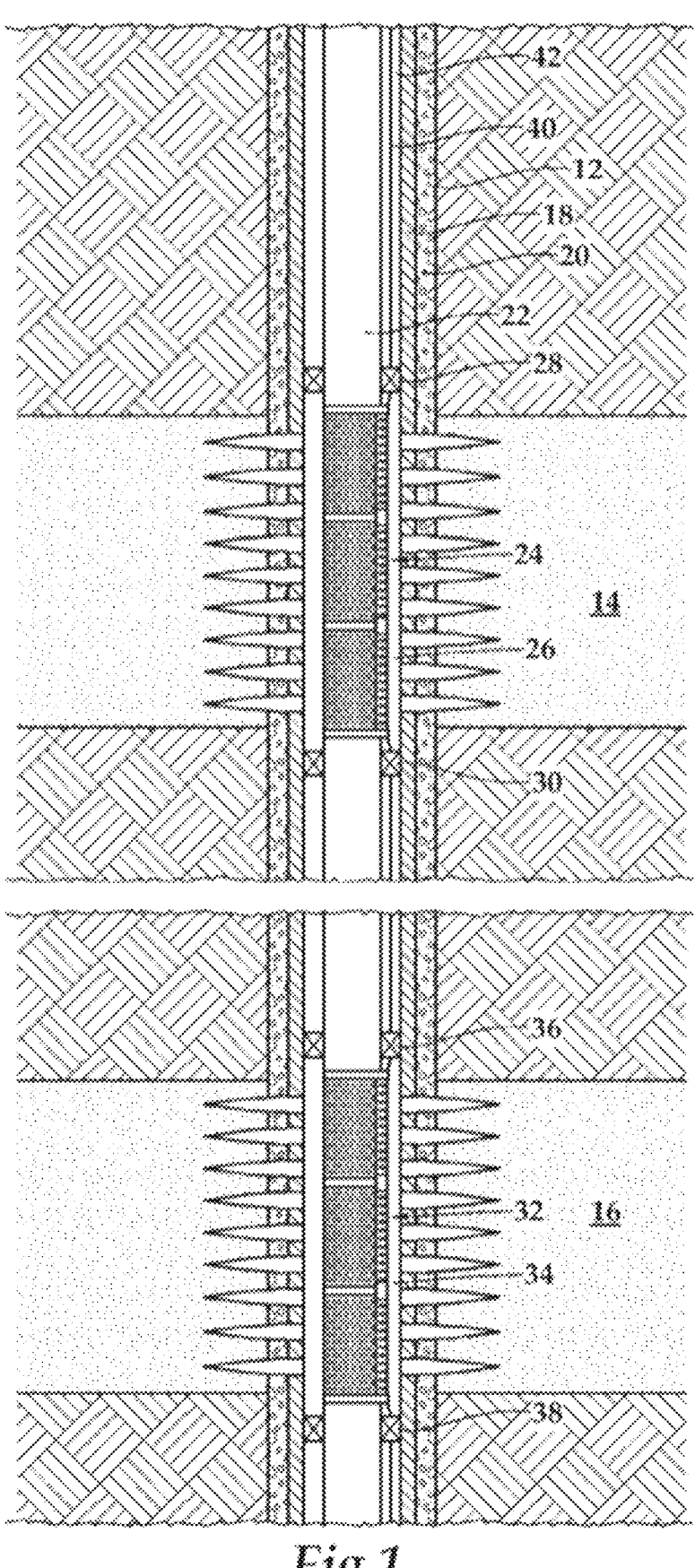
FIG. 1 is a perspective view in partial cross section of a wellbore including a pair of sand control screen assemblies having cables, according to some embodiments.

The description that follows includes example systems, methods, techniques, and program flows that embody aspects of the disclosure. However, it is understood that this disclosure may be practiced without these specific details. In some instances, well-known instruction instances, protocols, structures, and techniques have not been shown in detail in order not to obfuscate the description.

Example embodiments may include a modular line capture clamp to be used in various downhole wellbore applications. Such a clamp may be used to hold one or more lines in position. In some implementations, this clamp may be used to hold one or more lines in position in a channel over a sand control screen to limit inclusion of solids into the production fluid that is transported to a surface of the wellbore. In particular, during drilling and completion of wellbores, relatively fine particulate materials may be produced during the production of hydrocarbons from a wellbore that traverses an unconsolidated or loosely consolidated formation. Numerous problems may occur as a result of the production of such particulate. For example, the particulate causes abrasive wear to components within the wellbore, such as flow control devices, safety equipment, tubing and the like. In addition, the particulate may partially or fully clog the wellbore creating the need for an expensive workover. Also, if the particulate matter is produced to the surface, it must be removed from the hydrocarbon fluids using surface processing equipment. Additionally, problems may occur downhole if the cables running through the sand control screens are hanging loose (instead of being clamped down). For example, the cables may get hung on different equipment downhole while being positioned downhole (thereby causing damage to such cables). For example, if the cables are fiber optic or electrical cables (or include sensors), such damage to the cables may result in inoperability of these cables. These cables may include splices or sensors that may either be larger than a size of the cables or be sensitive to clamping loads. These splices or sensors can land anywhere, so a clamp that can be moved easily is needed.

Example implementations may include a modular type clamp to keep the cables at an essentially fixed position. In some implementations, the cables may be run along a channel and the channel may include multiple slots such that a given clamp may be easily moved to a different slot along the channel to avoid clamping down on the cable where a sensor and/or splice may be.

Example of the cables may be fiber optic cables, electrical cables, hydraulic cables, etc. The clamps may provide a level of compression on the cables. Accordingly, the clamps may provide some amount of support for the cable-so that the device that the cable is attached to does not have to support all of the weight of the cable between connection points.

Accordingly, example implementations may include a number of different slots in the channel at different depths of the wellbore so that if a sensor or splice is at one location of a pair of slots, the clamp may be moved to a different pair of slots. In some implementations, the clamp may be wider to provide more protection for the cables. For example, a width of the clamp may be at least 3 inches. However, in such implementations, the clamp may not be rotatable-thereby requiring the clamp to be removed from the channel in order to remove the cables from the channel.

In some implementations, the clamp may a simple t-slot type clamp. Since cutting (using laser, stamping, water jet, etc.) a sheet metal channel may be quick and easy, there may be many locations for these slot locations. Having this large number of mounting options allows for quick and easy modularity of the placement of these clamps. Some implementations may include at least 2× more slot locations than clamps provided. Accordingly, if a sensor is positioned on a cable where a clamp is also positioned, that clamp may be removed and relocated to the nearest slot location. In some implementations, the clamp does not need to be removed from the joint in order to install the cables. Rather, the clamp may just need to be loosened and rotated.

Accordingly, example implementations may include a T-slot clamp mounting design that may allow for modularity of clamping locations. Additionally, example implementations may include slots in a channel that the clamp may be dropped into after tightening that provide additional security for tensile and/or slippage of the cables.

Therefore, example implementations may provide a solution for handling the problem of unknown locations of sensors and splice landings in a cable positioned downhole in a wellbore. Also, example implementations may be tailored to a variety of cable designs by a simple clamp swap out (without changing the channel that may already be in stock with a customer). Additionally, in some implementations, a clamp lid may be customized for a changing number of cables or shapes and sizes. Also, it may be possible to change the clamp during the running of the system if cable configurations are changed at the last minute due to unforeseen issues.

While depicted such that cables are not essentially completely covered by such clamps, some implementations may be configured to provide for such covering. For example, clamps may be widened and placed adjacent to each other so that the cables are essentially completely covered. In some such implementations, a given clamp may be removed if a sensor or splice is in the cable at that location.

Accordingly, example implementations may include a modular t-slot clamp that may be removed or relocated as necessary to avoid clamping over a sensor or splice of the cable. The clamp may be considered modular because the clamp may be positioned at one of any number of locations in the channel where a pair of slots are positioned.

While described such that the channel with the multiple pair of slots along with modular cable clamps are part of a protective shroud around sand control screens as part of a completion string, example implementations may be used in other configurations. For example, the channel with the multiple pair of slots along with modular cable clamps may be integrated into the sand control screens themselves. In other examples, the channel with the multiple pair of slots along with modular cable clamps may be part of a downhole tubing that does not enclose sand control screens. Further, the channel with the multiple pair of slots along with modular cable clamps may be integrated into any type of downhole tubing (for production, completion, drilling, etc.).

Additionally, in some implementations, a clamp may be positioned on each side of a sensor and a covering or housing may be added between to cover or protect the sensor. In some implementations, the bottom part (orange) may be on each side of a sensor and a top part of the clamp may extend between the two bottom parts to provide a covering for the sensor.

Example Wellbore System

An example wellbore system having modular cable clamps is now described. FIG. 1 is a perspective view in partial cross section of a wellbore including a pair of sand control screen assemblies having cables, according to some embodiments. In FIG. 1, a wellbore 12 extends through the various earth strata including formations 14, 16. A casing 18 is supported within wellbore 12 by cement 20. A completion string 22 includes various tools such as a sand control screen assembly 24 that is positioned within production interval 26 between packers 28, 30. In addition, completion string includes a sand control screen assembly 32 that is positioned within production interval 34 between packers 36, 38. One or more cables 40 extend from the surface within annulus 42 as pass through sand control screen assemblies 24, 32 to provide instructions, carry power, signals and data, and transport operating fluid, such as hydraulic fluid, to sensors, actuators and the like associated with sand control screen assemblies 24, 32 and other tools or components positioned downhole. In some implementations, the cables 40 may be fiber optic cables, electrical cables, hydraulic cables, etc.

In one example, once completion string 22 is positioned as shown within wellbore 12, a treatment fluid containing sand, gravel, proppants or the like may be pumped down completion string 22 such that formations 14, 16 and production intervals 26, 34 may be treated. Sensors operably associated with completion string 22 may be used to provide substantially real time data to the operator via the cable 40 on the effectiveness of the treatment operation such as identifying voids during the gravel placement process to allow the operator to adjust treatment parameters such as pump rate, proppant concentration, fluid viscosity and the like to overcome deficiencies in the gravel pack. In addition, such sensors may be used to provide valuable information to the operator via cable 40 during the production phase of the well such as fluid temperature, pressure, velocity, constituent composition and the like such that the operator can enhance the production operations.

Even though FIG. 1 depicts sand control screen assemblies 24, 32 in a cased hole environment, it should be understood by those skilled in the art that the sand control screen assemblies of the present invention are equally well suited for use in open hole environments. Also, even though FIG. 1 depicts a single sand control screen assembly having three screen jackets in each production interval, it should be understood by those skilled in the art that any number of sand control screen assemblies each having any number of screen jackets may be deployed within a production interval without departing from the principles of the present invention. Further, even though FIG. 1 depicts a vertical completion, it should be understood by those skilled in the art that the sand control screen assemblies of the present invention are equally well suited for use in well having other directional configurations including horizontal wells, deviated wells, slanted wells, multilateral wells and the like. Accordingly, it should be understood by those skilled in the art that the use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

Example Completion Strings

Figure 2:
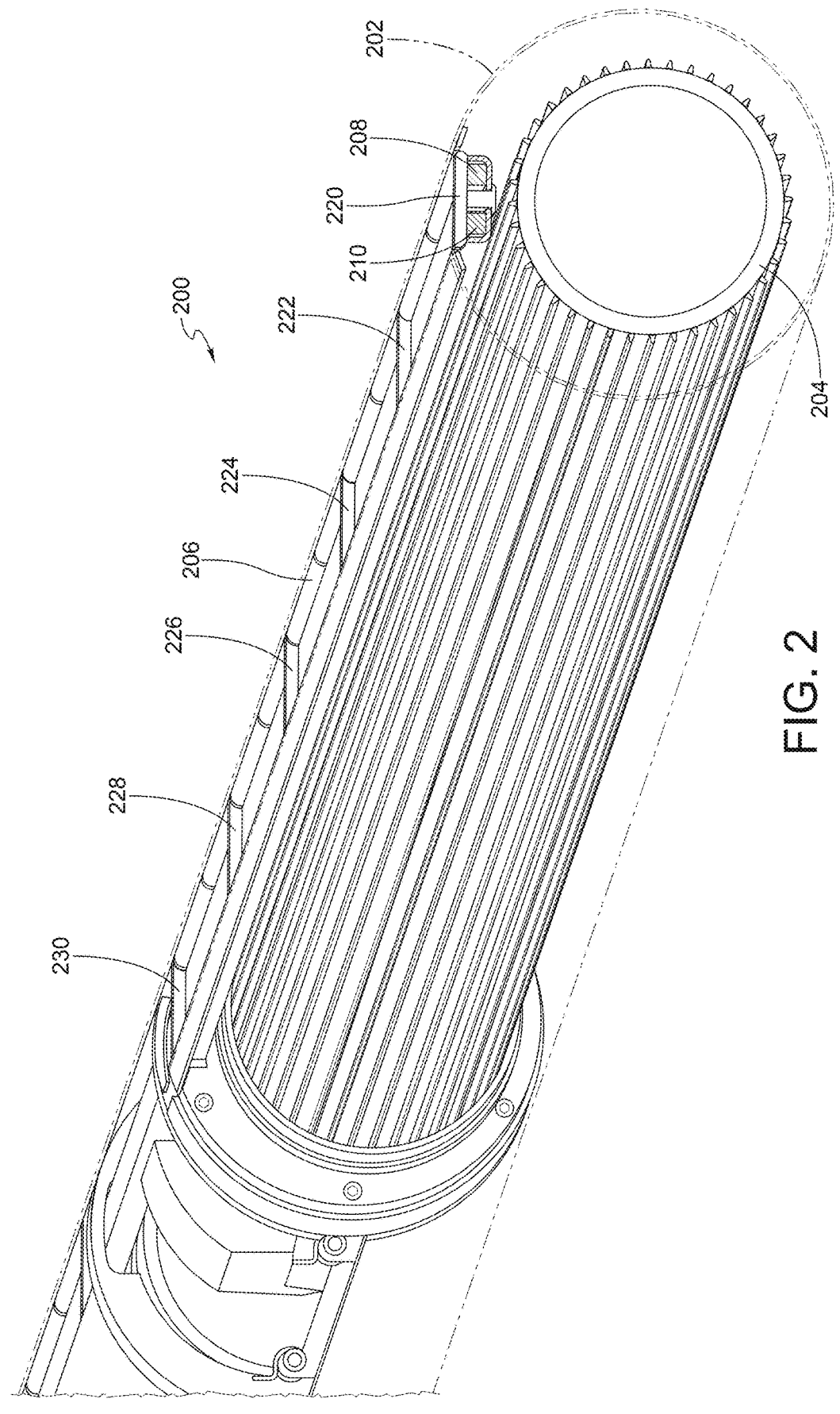
FIG. 2 is a perspective view of a completion string that includes clamps, according to some embodiments.

Example completion string having modular cable clamps are now described. FIG. 2 is a perspective view of a completion string that includes clamps, according to some embodiments. In particular, FIG. 2 depicts a completion string 200 that may be representative of the completion string 22 of FIG. 1. In some implementations, a diameter of the completion string 200 may be smaller than a diameter of the wellbore so that an annulus may be formed between the outer wall of the completion string and the wall of the wellbore.

In this example, the completion string 200 includes a protective shroud 202 that encloses a sand control screen assembly 204. The protective shroud 202 may include a number of perforations to allow for formation fluid to flow there through for filtering by the sand control assembly 204. The protective shroud 202 also includes a channel 206. Cables 208, 210 are run within the channel 206. Additionally, cable clamps 220, 222, 224, 226, 228, 230 may be modular so that the cable clamps 220, 222, 224, 226, 228, 230 may be positioned at different locations along the channel 206 to clamp down and secure the cables 208, 210 in the channel 206.

In some implementations, the channel 206 may include multiple pairs of slots into which a given cable clamp is positioned. Additionally, cable clamps 220, 222, 224, 226, 228, 230 may include sensors or splices. The splices or sensors that may either be larger than a size of the cables or be sensitive to clamping loads. Accordingly, the cable clamps 220, 222, 224, 226, 228, 230 may be moved to different pairs of the slots so that the cable clamps 220, 222, 224, 226, 228, 230 are not clamped onto the sensors or splices.

Figure 3:
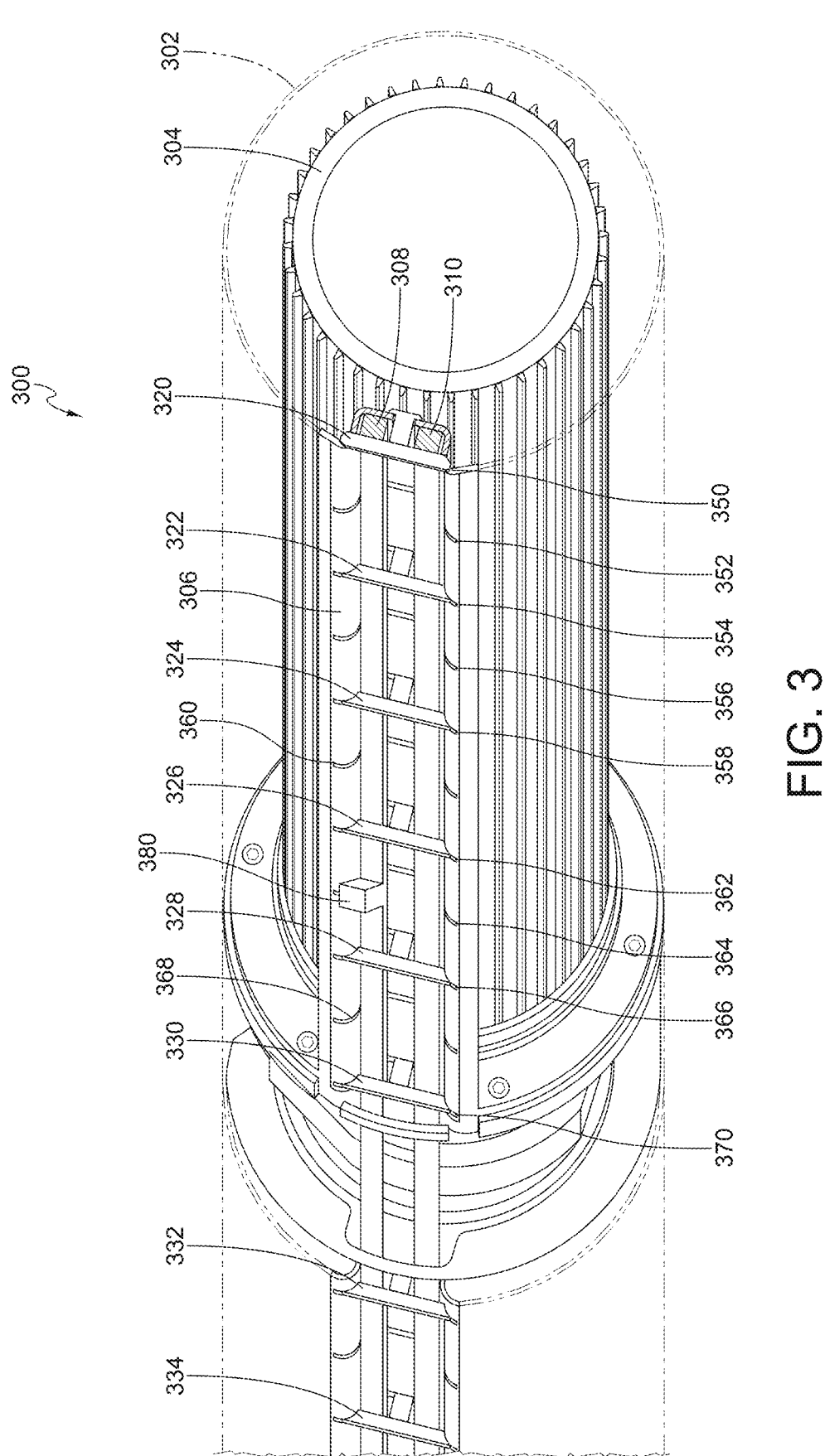
FIG. 3 is a first detailed perspective view of a completion string that includes clamps, according to some embodiments.

FIG. 3 is a first detailed perspective view of a completion string that includes clamps, according to some embodiments. In particular, FIG. 3 depicts a completion string 300 that may be representative of the completion string 22 of FIG. 1. In this example, the completion string 300 includes a protective shroud 302 that encloses a sand control screen assembly 304. The protective shroud 302 may include a number of perforations to allow for formation fluid to flow there through for filtering by the sand control assembly 304. The protective shroud 302 also includes a channel 306. Cables 308, 310 are run within the channel 306. Additionally, cable clamps 320, 322, 324, 326, 328, 330 may be modular so that the cable clamps 320, 322, 324, 326, 328, 330 may be positioned at different locations along the channel 306 to clamp down and secure the cables 308, 310 in the channel 306.

The channel 306 includes multiple pairs of slots 350, 352, 354, 356, 358, 360, 362, 364, 366, 368, 370 into which a given cable clamp is positioned. Additionally, the cables 308, 310 may include sensors or splices, such as the sensor 380. The splices or sensors that may either be larger than a size of the cables or be sensitive to clamping loads. Accordingly, the cable clamps 320, 322, 324, 326, 328, 330 may be moved to different pairs of the slots so that the cable clamps 320, 322, 324, 326, 328, 330 are not clamped onto the sensors or splices.

Figure 4:
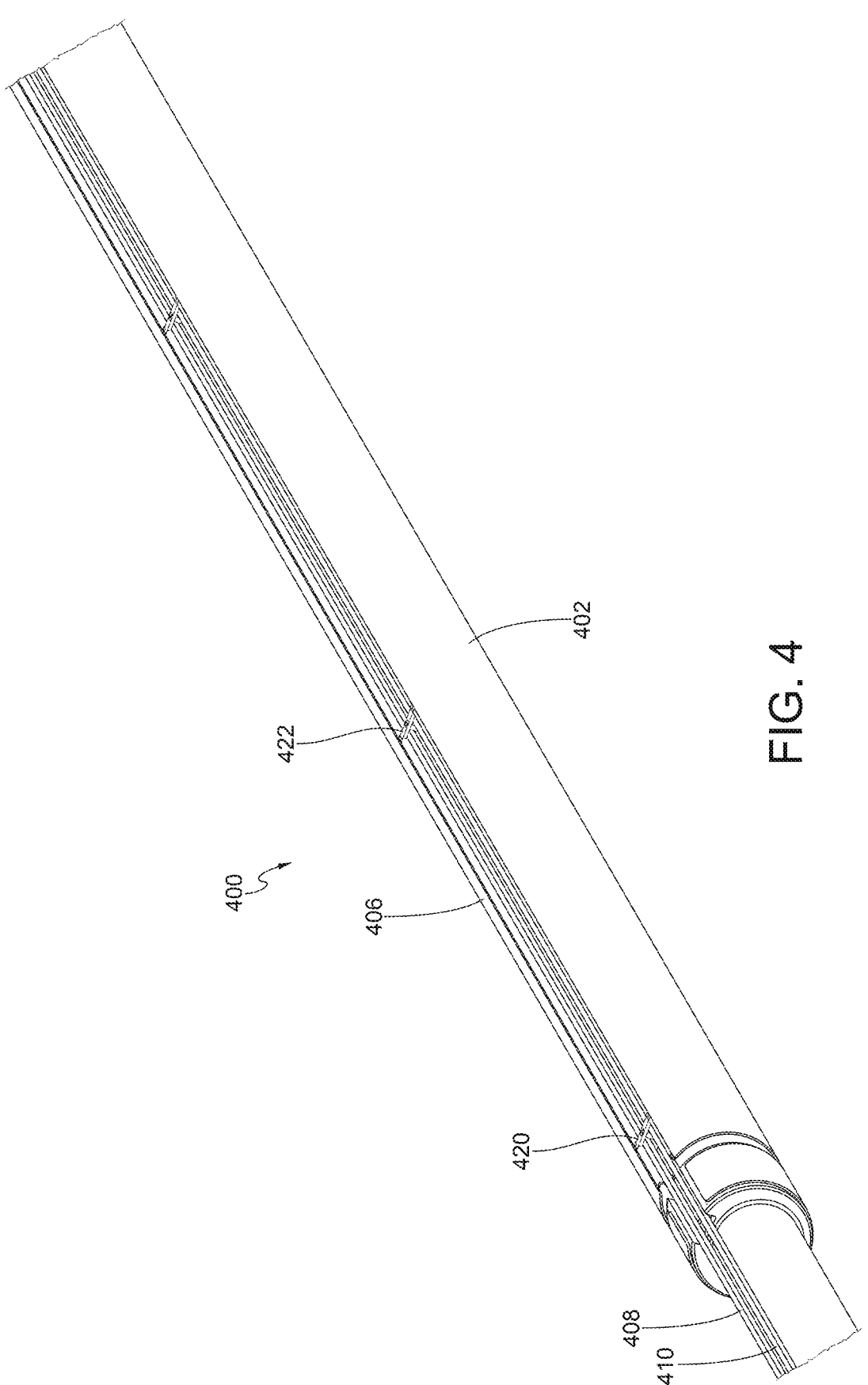
FIG. 4 is another perspective view of a completion string that includes clamps, according to some embodiments.

FIG. 4 is another perspective view of a completion string that includes clamps, according to some embodiments. In particular, FIG. 4 depicts a completion string 400 that may be representative of the completion string 22 of FIG. 1. In this example, the completion string 400 includes a protective shroud 402 that encloses a sand control screen assembly. The protective shroud 402 may include a number of perforations to allow for formation fluid to flow there through for filtering by the sand control assembly. The protective shroud 402 also includes a channel 406. Cables 408, 410 are run within the channel 406. Additionally, cable clamps 420, 422 may be modular so that the cable clamps may be positioned at different locations along the channel 406 to clamp down and secure the cables 408, 410 in the channel 406.

The channel 406 includes multiple pairs of slots into which a given cable clamp is positioned. Additionally, the cables 408, 410 may include sensors or splices. The splices or sensors that may either be larger than a size of the cables or be sensitive to clamping loads. Accordingly, the cable clamps 420, 422 may be moved to different pairs of the slots so that the cable clamps 420, 422 are not clamped onto the sensors or splices.

Figure 5:
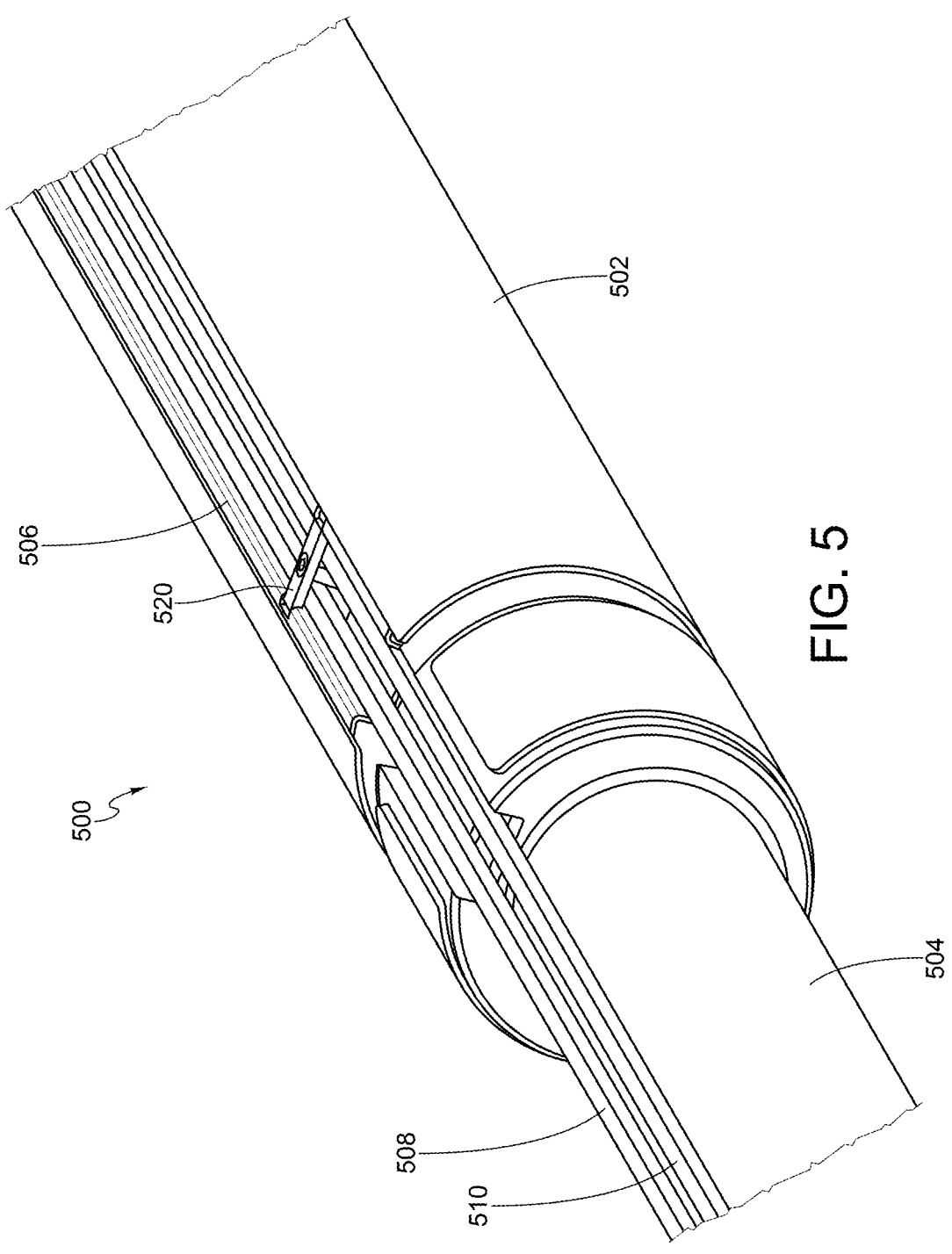
FIG. 5 is a second more detailed perspective view of a completion string that includes clamps, according to some embodiments.

FIG. 5 is a second more detailed perspective view of a completion string that includes clamps, according to some embodiments. In particular, FIG. 5 depicts a completion string 500 that may be representative of the completion string 22 of FIG. 1. In this example, the completion string 500 includes a protective shroud 502 that encloses a sand control screen assembly 504. The protective shroud 502 may include a number of perforations to allow for formation fluid to flow there through for filtering by the sand control assembly 504. The protective shroud 502 also includes a channel 506. Cables 508, 510 are run within the channel 506. Additionally, a cable clamp 520 may be modular so that the cable clamp 320 may be positioned at different locations along the channel 506 to clamp down and secure the cables 508, 510 in the channel 506.

The channel 506 includes multiple pairs of slots into which a given cable clamp is positioned. Additionally, the cables 508, 510 may include sensors or splices. The splices or sensors that may either be larger than a size of the cables or be sensitive to clamping loads. Accordingly, the cable clamp 520 may be moved to different pairs of the slots so that the cable clamp 520 is not clamped onto the sensors or splices.

Figure 6:
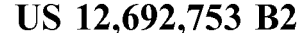
FIG. 6 is a third more detailed perspective view of a completion string that includes clamps, according to some embodiments.

FIG. 6 is a third more detailed perspective view of a completion string that includes clamps, according to some embodiments. In particular, FIG. 6 depicts a completion string 600 that may be representative of the completion string 22 of FIG. 1. In this example, the completion string 600 includes a protective shroud 602 that encloses a sand control screen assembly 604. The protective shroud 602 may include a number of perforations to allow for formation fluid to flow there through for filtering by the sand control assembly 604. The protective shroud 602 also includes a channel 606. Cables 608, 610 are run within the channel 606. Additionally, a cable clamp 620 may be modular so that the cable clamp 620 may be positioned at different locations along the channel 606 to clamp down and secure the cables 608, 610 in the channel 606.

The channel 606 includes multiple pairs of slots into which a given cable clamp is positioned. Additionally, the cables 608, 610 may include sensors or splices. The splices or sensors that may either be larger than a size of the cables or be sensitive to clamping loads. Accordingly, the cable clamp may be moved to different pairs of the slots so that the cable clamp 620 are not clamped onto the sensors or splices.

Figure 7:
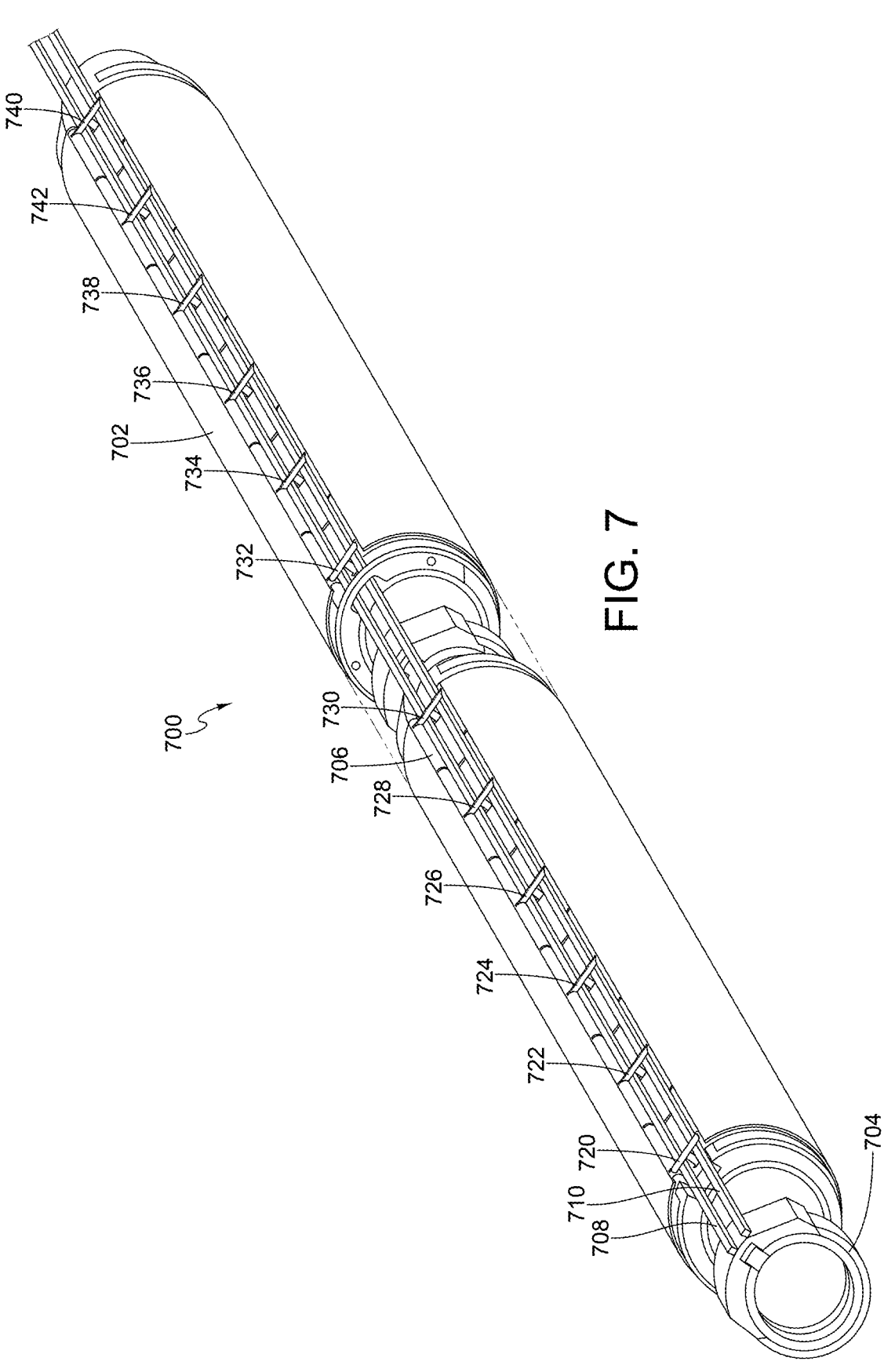
FIG. 7 is another perspective view of a completion string having multiple sections that include clamps, according to some embodiments.

FIG. 7 is another perspective view of a completion string having multiple sections that include clamps, according to some embodiments. In particular, FIG. 7 depicts a completion string 700 that may be representative of the completion string 22 of FIG. 1. In this example, the completion string 700 includes a protective shroud 702 that encloses a sand control screen assembly 704. The protective shroud 702 may include a number of perforations to allow for formation fluid to flow there through for filtering by the sand control assembly 704. The protective shroud 702 also includes a channel 706. Cables 708, 710 are run within the channel 706. Additionally, cable clamps 720, 722, 724, 726, 728, 730, 732, 734, 736, 738, 740 may be modular so that the cable clamps 720, 722, 724, 726, 728, 730, 732, 734, 736, 738, 740 may be positioned at different locations along the channel 706 to clamp down and secure the cables 708, 710 in the channel 706.

The channel 706 includes multiple pairs of slots into which a given cable clamp is positioned. Additionally, the cables 708, 710 may include sensors or splices. The splices or sensors that may either be larger than a size of the cables or be sensitive to clamping loads. Accordingly, the cable clamps 720, 722, 724, 726, 728, 730, 732, 734, 736, 738, 740 may be moved to different pairs of the slots so that the cable clamps 720, 722, 724, 726, 728, 730, 732, 734, 736, 738, 740 are not clamped onto the sensors or splices.

Figure 8:
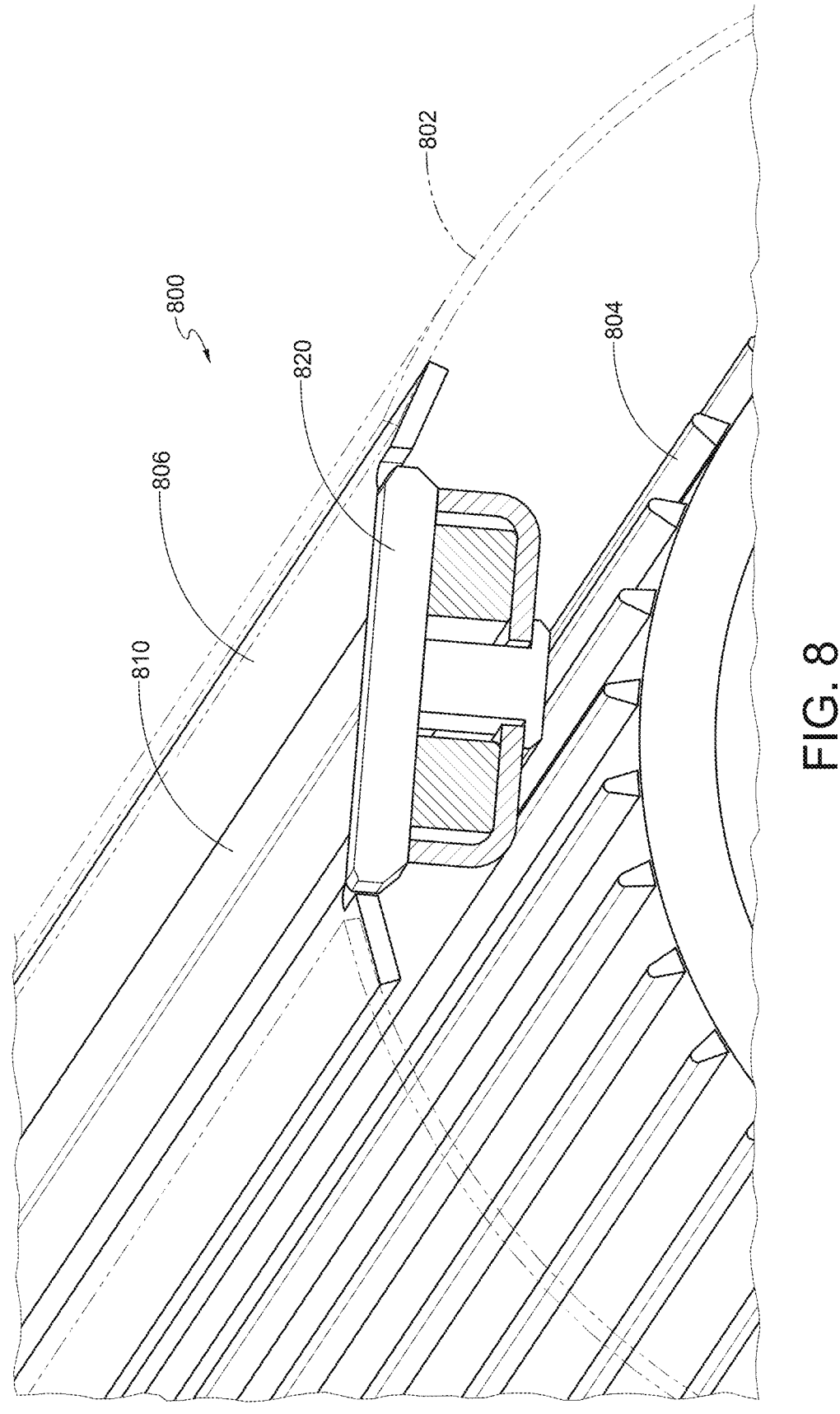
FIG. 8 is a more detailed perspective view of a completion string that includes a clamp clamped into position over two cables within a channel, according to some embodiments.

FIG. 8 is a more detailed perspective view of a completion string that includes a clamp clamped into position over two cables within a channel, according to some embodiments. In particular, FIG. 8 depicts a completion string 800 that may be representative of the completion string 22 of FIG. 1. In this example, the completion string 800 includes a protective shroud 802 that encloses a sand control screen assembly 804. The protective shroud 802 may include a number of perforations to allow for formation fluid to flow there through for filtering by the sand control assembly 804. The protective shroud 802 also includes a channel 806. A cables 810 is run within the channel 806. Additionally, a cable clamps 820 may be modular so that the cable clamps 820 may be positioned at different locations along the channel 806 to clamp down and secure the cables 810 in the channel 806.

Figure 9:
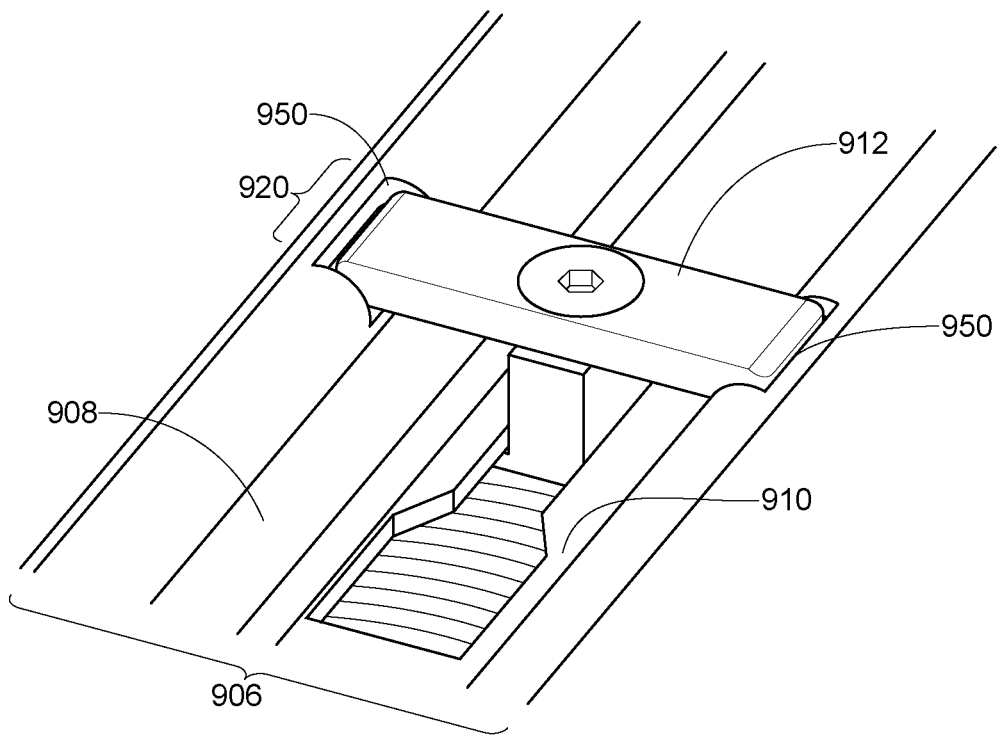
FIG. 9 is a perspective view of a clamp clamped into position holding down two cables within a channel, according to some embodiments.

The channel 806 includes multiple pairs of slots into which a given cable clamp is positioned. Additionally, the cables 810 may include sensors or splices. The splices or sensors that may either be larger than a size of the cables or be sensitive to clamping loads. Accordingly, the cable clamp 820 may be moved to different pairs of the slots so that the cable clamp 820 are not clamped onto the sensors or splices.
Example Clamps FIG. 9 is a perspective view of a clamp clamped into position holding down two cables within a channel, according to some embodiments. FIG. 9 depicts a channel 906 that includes a pair of slots 950. FIG. 9 also depicts cables 908, 910 positioned in the channel 906. Additionally, FIG. 9 depicts a clamp 920 positioned in the pair of slots 950. The clamp 920 may include a rotatable top 981, a bottom anchor 980, and a screw 982.

Figure 10B:
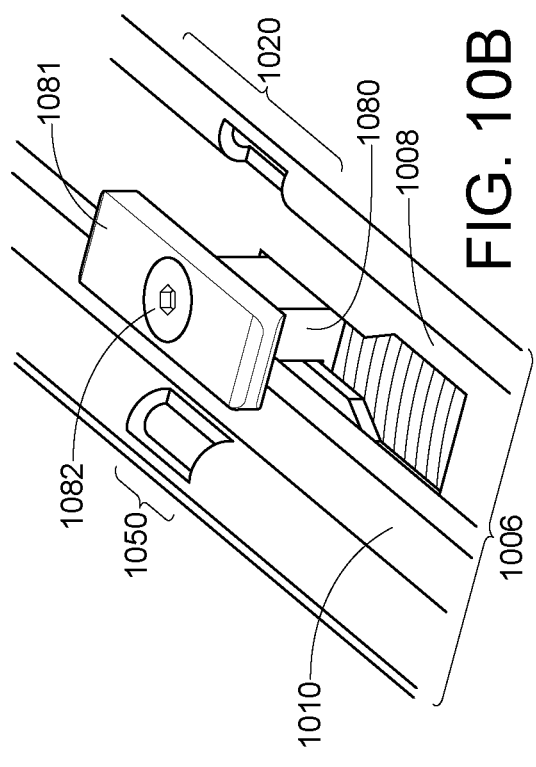
FIGS. 10A-10D are perspective views of an example order of operations for installing cables into a channel and a clamp used for clamping, according to some embodiments.
Figure 10D:
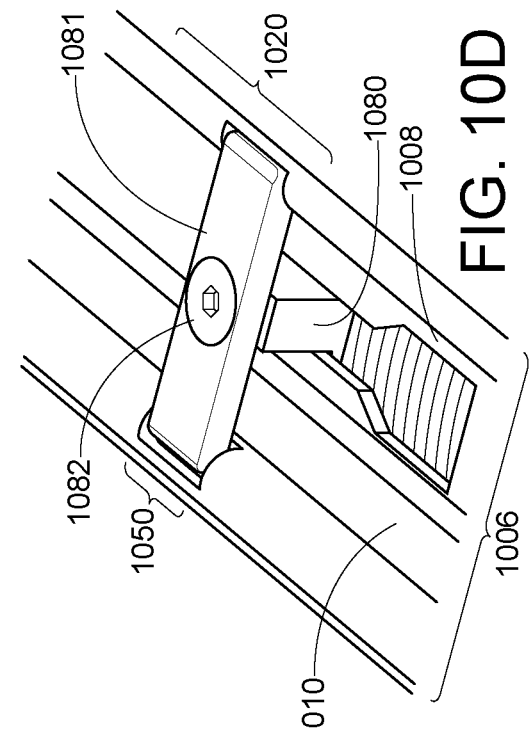
Figure 10A:
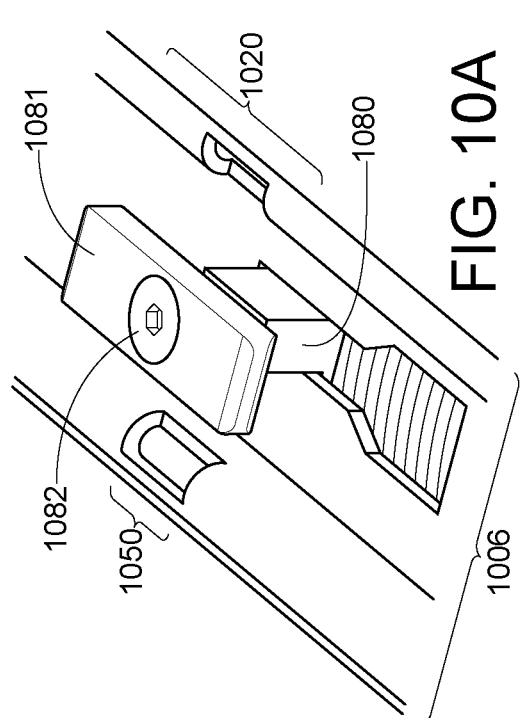

FIGS. 10A-10D are perspective views of an example order of operations for installing cables into a channel and a clamp used for clamping, according to some embodiments. FIG. 10A depicts a clamp 1020 in a non-clamped position without cables being positioned in a channel 1006. The clamp 1020 includes a rotatable top 1081, a bottom anchor 1080, and a screw 1082. The channel 1006 includes a pair of slots 1050 into which the clamp 1020 may be positioned.

For example, the channel 1006 may be part of a tubing to be positioned downhole in a wellbore. For instance, after the tubing is brought to a well rig site to be positioned downhole in the wellbore, the clamp 1020 may be rotated such that the clamp 1020 is essentially parallel with the longitudinal axis of the channel 1006.

Figure 10C:
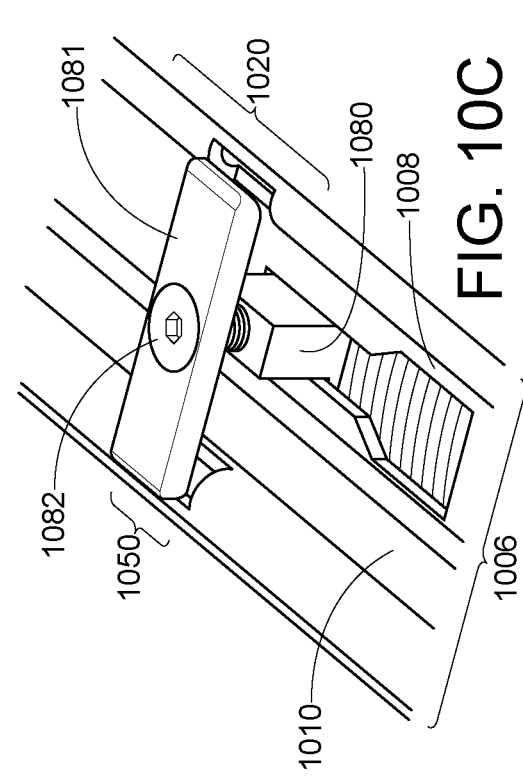

As shown, in FIG. 10B, after the rotatable top 1081 is rotated, cables 1008, 1010 may then be placed in the channel 1006 and slid past the clamp 1020 through the channel 1006 in order to position the cables 1008, 1010 in the channel 1006 prior to positioning the tubing downhole in the wellbore. In FIG. 10C, the rotatable top 1081 of the clamp 1020 is rotated back to a clamping position above the pair of slots 1050 in the channel 1006. In FIG. 10D, the clamp 1020 may then be clamped down in the pair of slots 1050 and tightened therein using the screw 1082 of the clamp 1020. Additionally, as shown, after the clamp 1020 is positioned in the pair of slots 1050 and tightened down, the pair of slots 1050 may preclude the clamp 1020 from slipping axially. Accordingly, as shown, there is no requirement that the clamp 1020 be removed in order to move and/or remove the cables 1008, 1010 from the channel 1006.

In some implementations, a length of the clamp 1020 is such that the clamp 1020 may be rotated (without being removed from the channel 1006) in order to move or remove the cables 1008, 1010 from the channel 1006. Accordingly, in some implementations, a length of the clamp 1020 may be directly correlated with a width of the channel 1006 in order to allow for rotation of the clamp 1020 without removal of the clamp 1020 from the channel 1006 in order to allow for movement or removal of the cables 1008, 1010 from the channel 1006. Thus, the wider the channel 1006, the longer the clamp 1020 may be. In some implementations, a length of clamp 1020 across the channel 1006 is less than a width of the channel 1006 but long enough to remain in position within the pair of slots 1050.

Figure 11:
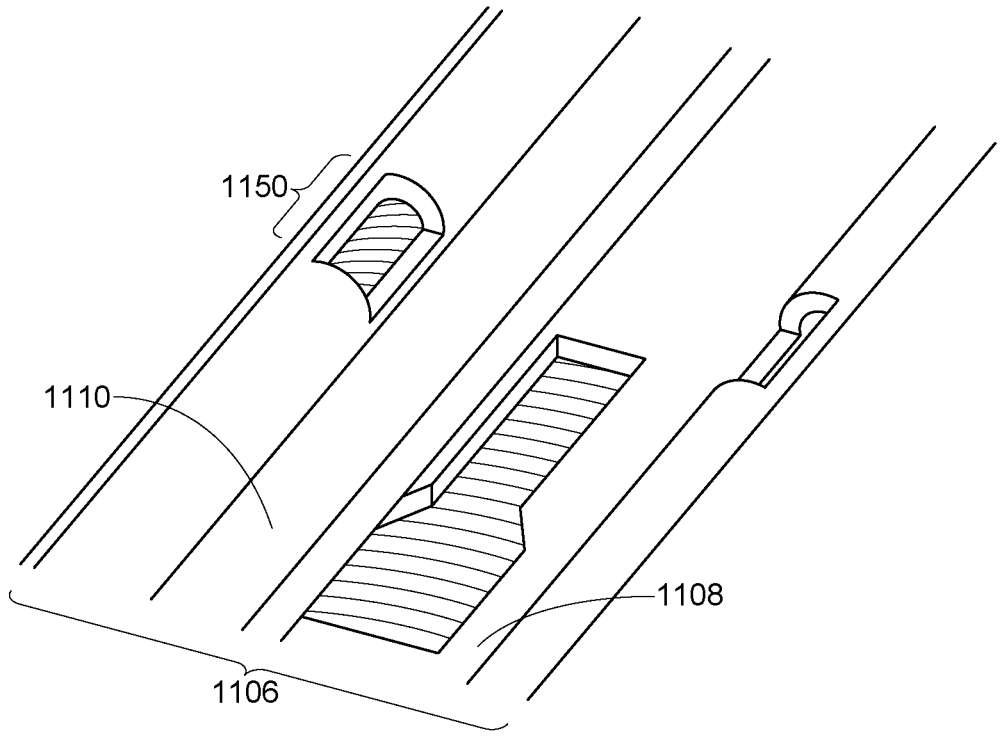
FIG. 11 is a perspective view of a channel with cables positioned therein and with the clamp removed, according to some embodiments.

FIG. 11 is a perspective view of a channel with cables positioned therein and with the clamp removed, according to some embodiments. FIG. 11 depicts a channel 1106 with the clamped removed. The channel 1106 also includes a pair of slots 1150. FIG. 11 also depicts cables 1108, 1110 being positioned in the channel 1106. Removing the clamp allows for additional space for sensors or splices or areas in the cables more sensitive to clamping.

Figure 12:
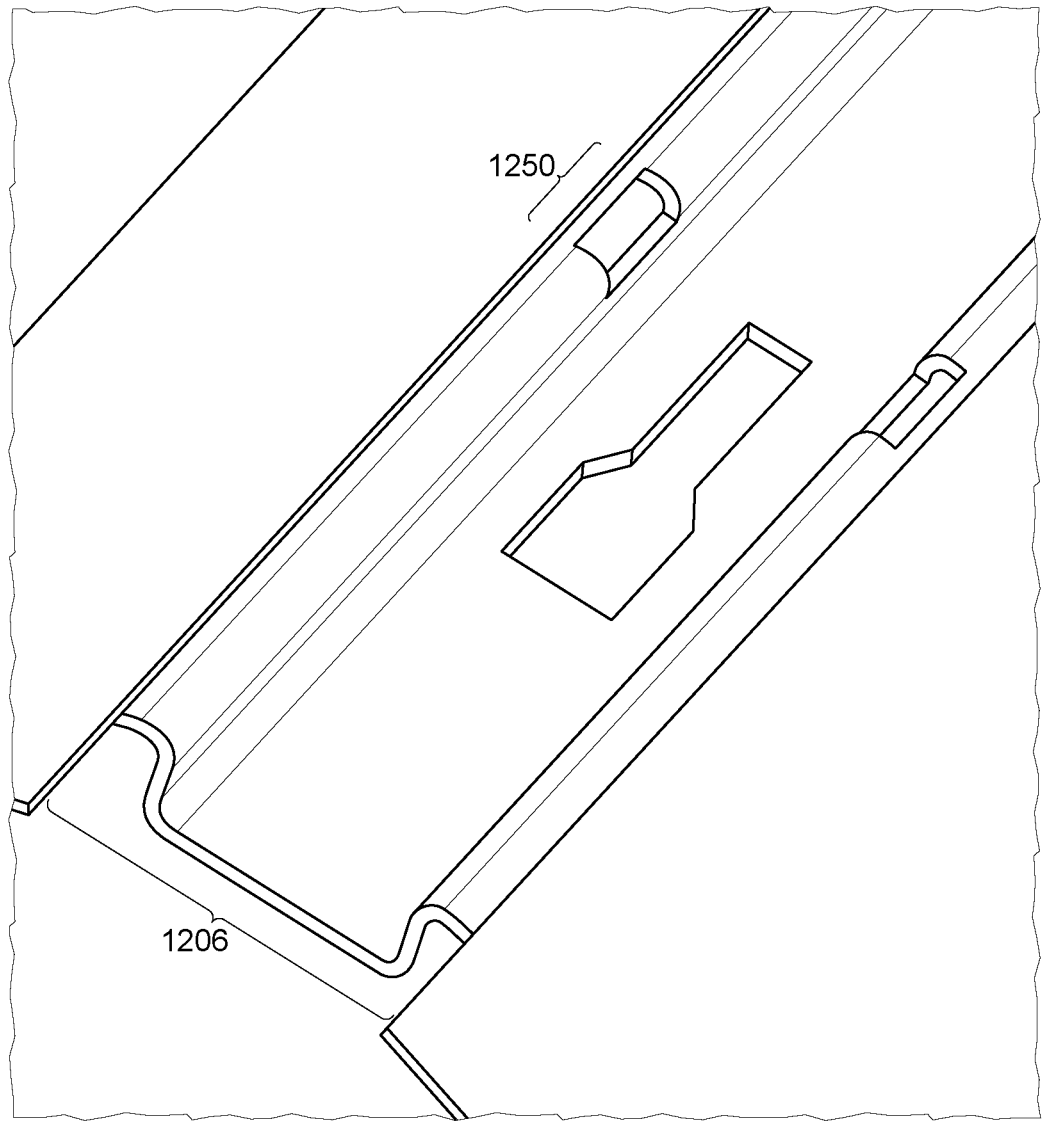
FIG. 12 is a perspective view of a channel having an example pair of slots cutout from the channel where a clamp may be positioned, according to some embodiments.

FIG. 12 is a perspective view of a channel having an example pair of slots cutout from the channel where a clamp may be positioned, according to some embodiments. FIG. 12 depicts a channel 1206 that includes a pair of slots 1250 into which a clamp may be positioned for holding cables in the channel 1206.

Figure 13:
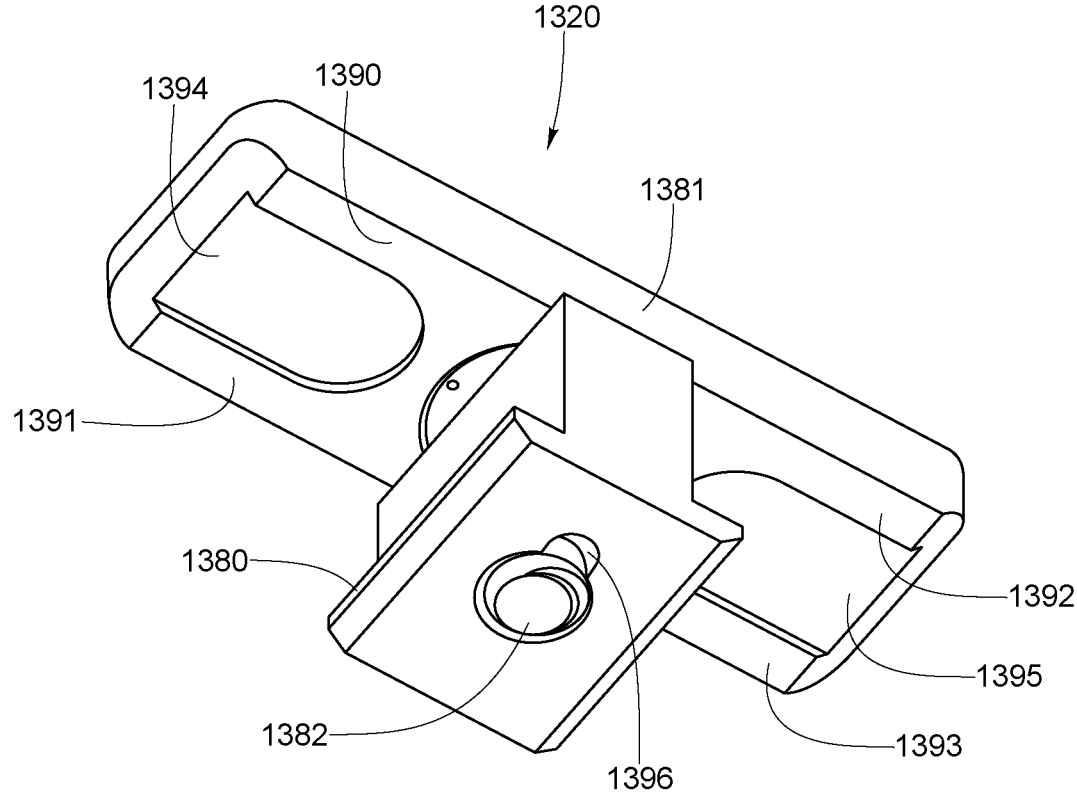
FIG. 13 is a perspective view of a bottom side of a t-slot clamp, according to some embodiments.

FIG. 13 is a perspective view of a bottom side of a t-slot clamp, according to some embodiments. FIG. 13 depicts a clamp 1320 that includes a rotatable top 1381, a bottom anchor 1380 on which the rotatable top 1381 rotates, and a screw 1382 that is threaded through the rotatable top 1381 and the bottom anchor 1380. A bottom side of the rotatable top 1381 includes a recessed area 1394 to form a non-recessed area 1390 and a non-recessed area 1391 on each side. The bottom side of the rotatable top 1381 also includes a recessed area 1395 to also form a non-recessed area 1392 and a non-recessed area 1393 on each side. These non-recessed areas 1390-1391 and 1392-1393 allow the clamp to increase the pressure on the cables as the clamp is tightened down onto the cables. As the clamp is tightened down, the recessed areas 1394-1395 may serve as locations where the covering of the cable may move into. Accordingly, the recessed areas 1390-1393 may allow the clamp to increase the bite into the encapsulation of the cables. Such implementations allow the clamp to support at least a portion of the weight of the cable. In some implementations, there may be a hole 1396 in the threaded area of the bottom anchor 1380. After the screw 1382 is tightened into the threaded area, a pin may be placed into the hole 1396 to deform the threads, the pin and threads may be struck to deform the threads so that the screw 1382 does not loosen.

Figure 14:
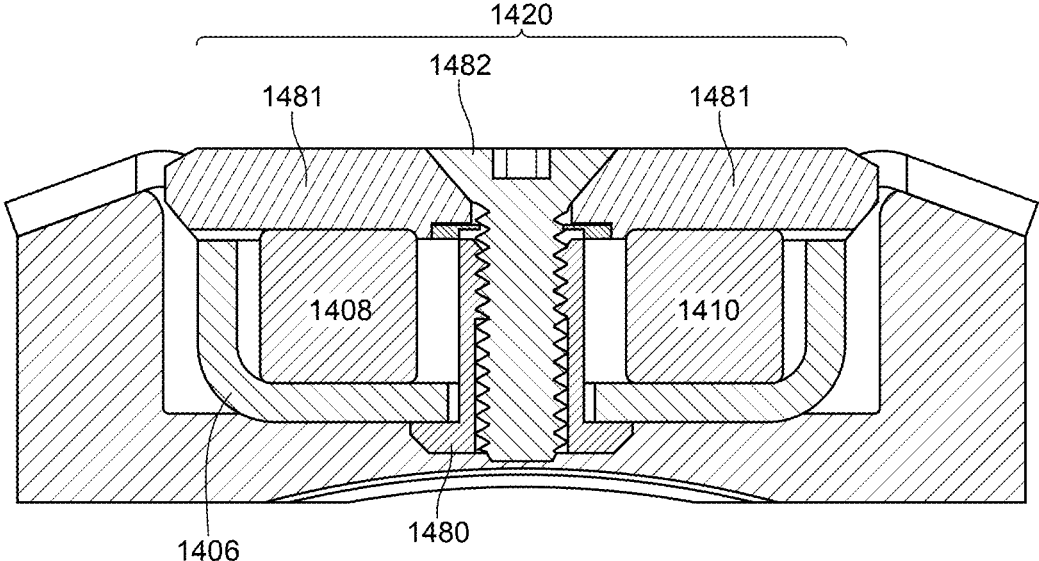
FIG. 14 is a cross-sectional view of clamp positioned for holding two cables in a channel, according to some embodiments.

FIG. 14 is a cross-sectional view of clamp positioned for holding two cables in a channel, according to some embodiments. FIG. 14 depicts a clamp 1420 that includes a rotatable top 1481, a bottom anchor 1480, and a screw 1482. FIG. 14 also depicts a channel 1406 and cables 1408, 1410 positioned therein. The clamp 1420 is positioned above the channel 1406 to clamp the cables 1408, 1410 down into a position in the channel 1406.

Figures 15A, 15B:
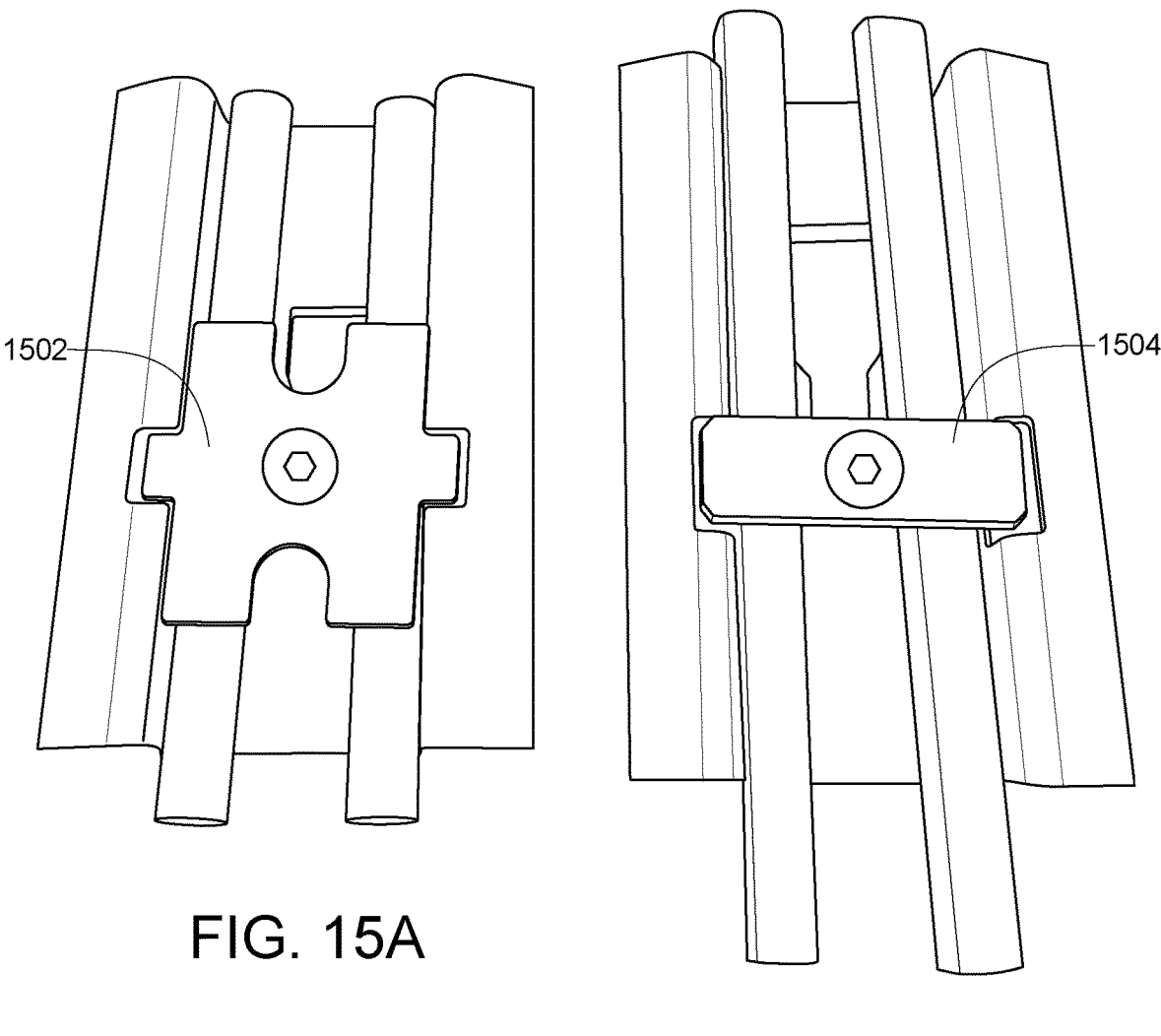
FIGS. 15A-15B are perspective views of two different clamps of differing widths, according to some embodiments.

FIGS. 15A-15B are perspective views of two different clamps of differing widths, according to some embodiments. FIGS. 15A-15B depict a clamp 1502 and a clamp 1504, respectively. As shown, the clamp 1502 is wider than the clamp 1504. Also, a width of the clamp 1502 is wider than the channel. Accordingly, in order to remove the cables, the clamp 1502 would need to be removed from the channel.

Example Operations

Figure 16:
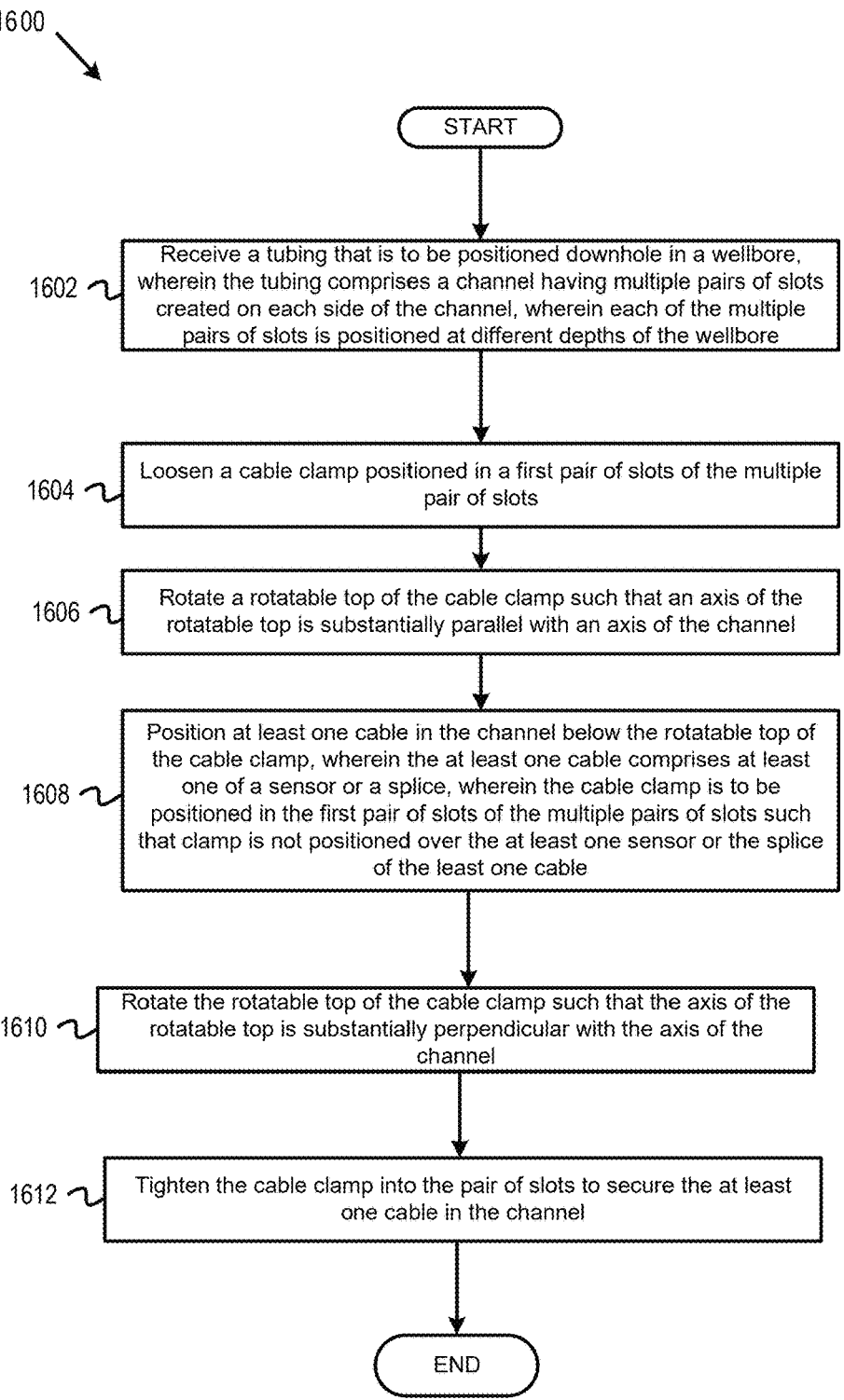
FIG. 16 is a flowchart of example operations for using a clamp for holding cables in a channel of a tubing for use downhole in a wellbore, according to some embodiments.

Example operations for using a clamp are now described. In particular, FIG. 16 is a flowchart of example operations for using a clamp for holding cables in a channel of a tubing for use downhole in a wellbore, according to some embodiments. Operations of a flowchart 1600 start at block 1602.

At block 1602, a tubing that is to be positioned downhole in a wellbore is received. The tubing comprises a channel having multiple pairs of slots created on each side of the channel, wherein each of the multiple pairs of slots is positioned at different depths of the wellbore.

At block 1604, a cable clamp positioned in a first pair of slots of the multiple pair of slots is loosened.

At block 1606, a rotatable top of the cable clamp is rotated such that an axis of the rotatable top is substantially parallel with an axis of the channel.

At block 1608, at least one cable is positioned in the channel below the rotatable top of the cable clamp. The at least one cable comprises at least one of a sensor or a splice, wherein the cable clamp is to be positioned in the first pair of slots of the multiple pairs of slots such that clamp is not positioned over the at least one sensor or the splice of the least one cable.

At block 1610, the rotatable top of the cable clamp is rotated such that the axis of the rotatable top is substantially perpendicular with the axis of the channel.

At block 1612, the cable clamp is tightened into the pair of slots to secure the at least one cable in the channel.

While the aspects of the disclosure are described with reference to various implementations and exploitations, it will be understood that these aspects are illustrative and that the scope of the claims is not limited to them. In general, techniques for simulating drill bit abrasive wear and damage during the drilling of a wellbore as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

EXAMPLE EMBODIMENTS

Embodiment #1: A tubing to be positioned in a wellbore, the tubing comprising: a channel having multiple pairs of slots created on each side of the channel, wherein each of the multiple pairs of slots is positioned at different depths of the wellbore, wherein at least one cable is to be positioned in the channel and comprises at least one of a sensor or a splice; and a clamp configured to be positioned in each of the multiple pairs of slots and configurable to clamp down on the at least one cable positioned in the channel, wherein the clamp is to be positioned in a first pair of slots of the multiple pairs of the slots such that clamp is not positioned over the at least one sensor or the splice of the least one cable.

Embodiment #2: The tubing of Embodiment #1, wherein the at least one cable comprises at least one of a fiber optic cable, an electrical cable, or a hydraulic cable.

Embodiment #3: The tubing of Embodiment #1, wherein the clamp comprises a t-slot clamp.

Embodiment #4: The tubing of Embodiment #3, wherein the clamp comprises a screw to tighten the clamp in position in the first pair of slots in the channel.

Embodiment #5: The tubing of Embodiment #4, wherein the clamp is configured to move between the first pair of slots in the channel to a second pair of slots of the multiple pairs of slots at a different depth of the wellbore.

Embodiment #6: The tubing of Embodiment #5, wherein the clamp configured to move between the first pair of slots in the channel to the second pair of slots comprises the screw of the clamp configured to loosen, the clamp configured to rotate such that the clamp is not within the first pair of slots, the clamp configured to move to a different depth of the wellbore associated with the second pair of slots, the clamp configured to rotate back to enable the clamp to be positioned in the second pair of slots, and the screw of the clamp configured to retighten.

Embodiment #7: The tubing of Embodiment #1, wherein a length of the clamp is less than a width of the channel.

Embodiment #8: The tubing of Embodiment #1, wherein the channel is formed in a perforated shroud that is to enclose a sand control screen that is to limit particulates entering therethrough from a formation fluid flowing through the sand control screen from a surrounding subsurface formation into which the wellbore is formed.

Embodiment #9: An apparatus comprising: a cable clamp configurable to be positioned in each of the multiple pairs of slots within a channel that is part of a tubing to be positioned downhole in a wellbore, wherein each of the multiple pairs of slots is positioned at different depths of the wellbore, wherein at least one cable is to be positioned in the channel and comprises at least one of a sensor or a splice, wherein the clamp is to be positioned in a first pair of slots of the multiple pairs of the slots such that clamp is not positioned over the at least one sensor or the splice of the least one cable.

Embodiment #10: The apparatus of Embodiment #9, wherein the at least one cable comprises at least one of a fiber optic cable, an electrical cable, or a hydraulic cable.

Embodiment #11: The apparatus of Embodiment #9, wherein the cable clamp comprises a t-slot clamp.

Embodiment #12: The apparatus of Embodiment #11, wherein the cable clamp comprises a screw to tighten the cable clamp in position in the first pair of slots in the channel.

Embodiment #13: The apparatus of Embodiment #12, wherein the cable clamp is configured to move between the first pair of slots in the channel to a second pair of slots of the multiple pairs of slots at a different depth of the wellbore.

Embodiment #14: The apparatus of Embodiment #13, wherein the cable clamp configured to move between the first pair of slots in the channel to the second pair of slots comprises the screw of the cable clamp configured to loosen, the cable clamp configured to rotate such that the cable clamp is not within the first pair of slots, the cable clamp configured to move to a different depth of the wellbore associated with the second pair of slots, the cable clamp configured to rotate back to enable the cable clamp to be positioned in the second pair of slots, and the screw of the cable clamp configured to retighten.

Embodiment #15: The apparatus of Embodiment #9, wherein a length of the cable clamp is less than a width of the channel.

Embodiment #16: The apparatus of Embodiment #9, wherein the channel is formed in a perforated shroud that is to enclose a sand control screen that is to limit particulates entering therethrough from a formation fluid flowing through the sand control screen from a surrounding subsurface formation into which the wellbore is formed.

Embodiment #17: A method comprising: receiving a tubing that is to be positioned downhole in a wellbore, wherein the tubing comprises a channel having multiple pairs of slots created on each side of the channel, wherein each of the multiple pairs of slots is positioned at different depths of the wellbore; loosening a cable clamp positioned in a first pair of slots of the multiple pair of slots; rotating a rotatable top of the cable clamp such that an axis of the rotatable top is substantially parallel with an axis of the channel; positioning at least one cable in the channel below the rotatable top of the cable clamp, wherein the at least one cable comprises at least one of a sensor or a splice, wherein the cable clamp is to be positioned in the first pair of slots of the multiple pairs of slots such that clamp is not positioned over the at least one sensor or the splice of the least one cable; rotating the rotatable top of the cable clamp such that the axis of the rotatable top is substantially perpendicular with the axis of the channel; and tightening the cable clamp into the pair of slots to secure the at least one cable in the channel.

Embodiment #18: The method of Embodiment #17, wherein the at least one cable comprises at least one of a fiber optic cable, an electrical cable, or a hydraulic cable.

Embodiment #19: The method of Embodiment #17, wherein the cable clamp comprises a t-slot clamp.

Embodiment #20: The method of Embodiment #19, wherein the cable clamp comprises a screw to tighten the clamp in position in the first pair of slots in the channel.

Embodiment #21: The method of Embodiment #20, further comprising:

moving the cable clamp from the first pair of slots in the channel to a second pair of slots of the multiple pairs of slots at a different depth of the wellbore.

Embodiment #22: The method of Embodiment #21, moving the cable clamp comprises: loosening the screw of the cable clamp; rotating the cable clamp such that the cable clamp is not within the first pair of slots; moving the cable clamp to a different depth of the wellbore associated with the second pair of slots; rotating the cable clamp back to enable the cable clamp to be positioned in the second pair of slots, and retightening the screw of the clamp.

Embodiment #23: The method of Embodiment #17, wherein a length of the clamp is less than a width of the channel.

Embodiment #24: The method of Embodiment #17, wherein the channel is formed in a perforated shroud that is to enclose a sand control screen that is to limit particulates entering therethrough from a formation fluid flowing through the sand control screen from a surrounding subsurface formation into which the wellbore is formed.

The invention claimed is:

1. A tubing to be positioned in a wellbore, the tubing comprising:
a channel having multiple pairs of slots created on each side of the channel, wherein each of the multiple pairs of slots is positioned at different depths of the wellbore, wherein at least one cable is to be positioned in the channel and comprises at least one of a sensor or a splice; and
a clamp configured to be positioned in each of the multiple pairs of slots and configurable to clamp down on the at least one cable positioned in the channel, wherein the clamp is to be positioned in a first pair of slots of the multiple pairs of the slots such that clamp is not positioned over the at least one sensor or the splice of the least one cable, wherein the clamp comprises a rotatable top, a bottom anchor, and a screw threaded through the rotatable top and the bottom anchor, wherein the rotatable top is rotatable relative to the bottom anchor and wherein the rotatable top rotates about the screw when the bottom anchor is engaged with the channel.

2. The tubing of claim 1, wherein the at least one cable comprises at least one of a fiber optic cable, an electrical cable, or a hydraulic cable.

3. The tubing of claim 1, wherein the clamp comprises a t-slot clamp.

4. The tubing of claim 3, wherein the clamp comprises the screw to tighten the clamp in position in the first pair of slots in the channel.

5. The tubing of claim 4, wherein the clamp is configured to move between the first pair of slots in the channel to a second pair of slots of the multiple pairs of slots at a different depth of the wellbore.

6. The tubing of claim 5, wherein the clamp configured to move between the first pair of slots in the channel to the second pair of slots comprises
the screw of the clamp configured to loosen,
the clamp configured to rotate such that the clamp is not within the first pair of slots,
the clamp configured to move to a different depth of the wellbore associated with the second pair of slots,
the clamp configured to rotate back to enable the clamp to be positioned in the second pair of slots, and
the screw of the clamp configured to retighten.

7. The tubing of claim 1, wherein a length of the clamp is less than a width of the channel.

8. The tubing of claim 1, wherein the channel is formed in a perforated shroud that is to enclose a sand control screen that is to limit particulates entering therethrough from a formation fluid flowing through the sand control screen from a surrounding subsurface formation into which the wellbore is formed.

9. An apparatus comprising:
a cable clamp configurable to be positioned in any one of multiple pairs of slots within a channel that is part of a tubing to be positioned downhole in a wellbore, wherein the cable clamp comprises a rotatable top, a bottom anchor, and a screw threaded through the rotatable top and the bottom anchor, wherein the rotatable top is rotatable relative to the bottom anchor and wherein the rotatable top rotates about the screw when the bottom anchor is engaged with the channel,
wherein each of the multiple pairs of slots is positioned at different depths of the wellbore, wherein at least one cable is to be positioned in the channel and comprises at least one of a sensor or a splice, wherein the clamp is to be positioned in a first pair of slots of the multiple pairs of the slots such that clamp is not positioned over the at least one sensor or the splice of the least one cable.

10. The apparatus of claim 9, wherein the at least one cable comprises at least one of a fiber optic cable, an electrical cable, or a hydraulic cable.

11. The apparatus of claim 9, wherein the cable clamp comprises a t-slot clamp.

12. The apparatus of claim 11, wherein the cable clamp comprises a screw to tighten the cable clamp in position in the first pair of slots in the channel.

13. The apparatus of claim 12, wherein the cable clamp is configured to move between the first pair of slots in the channel to a second pair of slots of the multiple pairs of slots at a different depth of the wellbore.

14. The apparatus of claim 13, wherein the cable clamp configured to move between the first pair of slots in the channel to the second pair of slots comprises
the screw of the cable clamp configured to loosen,
the cable clamp configured to rotate such that the cable clamp is not within the first pair of slots,
the cable clamp configured to move to a different depth of the wellbore associated with the second pair of slots,
the cable clamp configured to rotate back to enable the cable clamp to be positioned in the second pair of slots, and
the screw of the cable clamp configured to retighten.

15. The apparatus of claim 9, wherein a length of the cable clamp is less than a width of the channel.

16. The apparatus of claim 9, wherein the channel is formed in a perforated shroud that is to enclose a sand control screen that is to limit particulates entering therethrough from a formation fluid flowing through the sand control screen from a surrounding subsurface formation into which the wellbore is formed.

17. A method comprising:
receiving a tubing that is to be positioned downhole in a wellbore, wherein the tubing comprises a channel having multiple pairs of slots created on each side of the channel, wherein each of the multiple pairs of slots is positioned at different depths of the wellbore;
loosening a cable clamp positioned in a first pair of slots of the multiple pair of slots;
rotating a rotatable top of the cable clamp such that an axis of the rotatable top is substantially parallel with an axis of the channel;
positioning at least one cable in the channel below the rotatable top of the cable clamp, wherein the at least one cable comprises at least one of a sensor or a splice, wherein the cable clamp is to be positioned in the first pair of slots of the multiple pairs of slots such that clamp is not positioned over the at least one sensor or the splice of the least one cable;
rotating the rotatable top of the cable clamp such that the axis of the rotatable top is substantially perpendicular with the axis of the channel; and
tightening the cable clamp into the pair of slots to secure the at least one cable in the channel.

18. The method of claim 17, wherein the at least one cable comprises at least one of a fiber optic cable, an electrical cable, or a hydraulic cable.

19. The method of claim 17, wherein the cable clamp comprises a t-slot clamp.

20. The method of claim 19, wherein the cable clamp comprises a screw to tighten the clamp in position in the first pair of slots in the channel.

21. The method of claim 20, further comprising:
moving the cable clamp from the first pair of slots in the channel to a second pair of slots of the multiple pairs of slots at a different depth of the wellbore.

22. The method of claim 21, moving the cable clamp comprises:
loosening the screw of the cable clamp;
rotating the cable clamp such that the cable clamp is not within the first pair of slots;
moving the cable clamp to a different depth of the wellbore associated with the second pair of slots;
rotating the cable clamp back to enable the cable clamp to be positioned in the second pair of slots; and
retightening the screw of the clamp.

23. The method of claim 17, wherein a length of the clamp is less than a width of the channel.

24. The method of claim 17, wherein the channel is formed in a perforated shroud that is to enclose a sand control screen that is to limit particulates entering therethrough from a formation fluid flowing through the sand control screen from a surrounding subsurface formation into which the wellbore is formed.

* * * * *